United States Patent Office 3,074,965

Patented Jan. 22, 1963

3,074,965

PYRANE DERIVATIVES

Johannes Donatus von Mikusch-Buchberg, Hamburg-Harburg, Germany, assignor, by mesne assignments, to Unilever Limited, London, England, a company of England No Drawing. Filed Aug. 28, 1958, Ser. No. 757,657
Claims priority, application Great Britain Aug. 30, 1957
4 Claims. (Cl. 260—345.9)

This invention relates to pyrane derivatives and provides new derivatives of oxo-pyrane and new methods for preparing such derivatives.

The pyrane derivatives of the present invention are oxo-pyranes having attached to each of four different carbon atoms of the heterocyclic ring an acyclic hydrocarbon group, two of the acyclic hydrocarbon groups containing 1 to 20 carbon atoms and the other two acyclic hydrocarbon groups containing 2 to 21 carbon atoms, the pyrane derivatives having two carbon to carbon double bonds apart from any within the acyclic hydrocarbon groups.

The acyclic hydrocarbon groups may be saturated or unsaturated and branched or unbranched. In the derivatives of most interest both carbon to carbon double bonds are in the ring but the invention includes derivatives in which at least one of the double bonds is between the ring and one of the hydrocarbon groups, that group being an enyl group.

Of particular importance among the oxo-pyrane derivatives of the invention are gamma-pyrones of the formula:

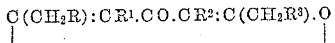

where R, $R^1$, $R^2$ and $R^3$ are acyclic hydrocarbon radicals containing 1 to 20 carbon atoms. R, $R^1$, $R^2$ and $R^3$ are preferably identical, but may be different.

Isomers of these pyrones include alpha-pyrones of the formula:

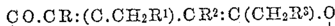

and derivatives with double bonds connecting one of the hydrocarbon groups (an enyl group) to the ring such as:

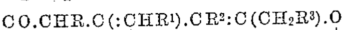

and

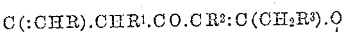

and derivatives with double bonds connecting two of the hydrocarbon groups to the ring such as:

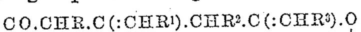

and

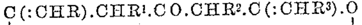

The products of the invention may be prepared by heating together a beta-diketone of the formula $R^1.CH_2.CO.CHR^2.CO.CH_2.R^3$ and a carboxylic acid of the formula $R.CH_2.COOH$ or, preferably, an anhydride of such an acid, at temperatures between 220 and 350° C. in the presence of a catalyst and removing water and other undesired products from the reaction mixture as they are formed.

The catalysts employed are oxygen-containing boron compounds of an acid nature or capable of forming compounds of an acid nature, i.e. capable of forming esters or anhydrides by reaction with —OH or —CO.OH groups, during the reaction. They include: inorganic boron compounds such as boric oxide, boric acid, and salts of boric acid with weak or volatile bases such as zinc borate and ammonium pentaborate; and organic boron compounds such as esters of boric acid and mixed anhydrides of boric acid and organic acids, for example boric acid trimethyl ester, boric acid triethyl ester, boric acid mannitol ester, the mixed anhydride of boric acid and acetic acid and the mixed anhydrides of boric acid and higher fatty acids. Borax and oxidising boron compounds such as perborate are less suitable.

The process may be carried out at normal or reduced pressure. The reaction mixture may be kept at the boiling temperature of the mixture and carboxylic acid distilling off may be condensed and returned to the reaction mixture after removal of water. Alternatively a solvent of appropriate boiling point may be used. The solvent, when used, is partly distilled off together with any water liberated, condensed, separated from the water and may be returned wholly or in part to the reaction mixture.

After completion of the treatment any residual acid or acid anhydride may be removed, for instance by distillation and the residue freed from catalyst, for instance by washing with water.

The acids that can be employed (as such or in the form of their anhydrides) in the condensation include: unbranched paraffinic monocarboxylic acids, such as propionic, butyric, valeric, caproic and oenanthic, caprylic, capric, lauric, myristic, palmitic and stearic acids, branched paraffinic monocarboxylic acids such as pivalic and isocaproic acids, and olefin monocarboxylic acids such as 4-hexenoic, oleic, linoleic, and erucic acids. Acids with terminal unsaturation such as vinylacetic acid tend to undergo polymerization unless suitable precautions are taken.

The invention includes using mixed anhydrides of two acids of the formula specified.

Diketones for use in making the pyrones include for instance, 4-methyl-hepta-3:5 dione, 5-ethyl-nona-4:6-dione, 6-propyl-undeca-5:7-dione, 7-butyl-trideca-6:8-dione.

When R is an unsaturated hydrocarbon group care should be taken to avoid polymerization as much as possible. Polymerization mostly occurs when the degree of unsaturation is too high.

The oxo-pyranes of the invention provide new intermediates for use in organic syntheses, new plasticizers, and new cutting oils. For these purposes the compounds in which the hydrocarbon radicals are saturated are particularly useful. The oxo-pyranes in which one or more of the hydrocarbon radicals contains at least two double bonds have drying properties and are useful as vehicles for paints, varnishes, etc.

The products of the invention are colourless crystals, or more or less viscous liquids according to their molecular weight, with a colour varying from light yellow to brown. They show an increased iodine value as compared with the diketones, acids, or anhydrides used as starting materials, owing to the two extra double bonds formed in or near the pyrane ring during condensation. The gamma-pyrones and some of their isomers are unsaponifiable; others, including alpha-pyrones are saponifiable, but, probably owing to the presence of the four hydrocarbon groups on the pyrane ring, to a smaller extent than alpha-pyrone itself.

The invention will now be illustrated by the following examples, wherein all the parts are by weight.

*Example 1*

10 parts of 7-butyl-trideca-6:8-dione were heated with 16 parts of caproic acid anhydride and 2 parts of boric oxide at atmospheric pressure for 1 hour at 250 to 260° C. and then for 3 hours at 270 to 300° C. Caproic acid was distilled off and the higher boiling compounds refluxed by means of a fractionating column mounted on the reaction vessel. The temperature was then lowered to 200° C., the pressure reduced to below 14 mm. and the reaction mixture fractionated at temperatures rising from 200 to 350° C. Besides caproic acid (11.2 parts) a main fraction (9.9 parts) boiling at 235° C. under a pressure of 14 mm. was obtained. This was composed mainly of 2:6-dipentyl-3:5-dibutyl-gamma-pyrone.

*Example 2*

A mixture of 13.4 parts of 7-butyl-trideca-6:8-dione, 5.8 parts of caproic acid and 0.9 part of boric oxide was heated for two hours at boiling temperature at atmospheric pressure in a reaction vessel fitted with a fractionating column. 5.8 parts of caproic acid were then added and the reaction mixture was kept boiling for another 7 hours on an oil-bath kept at a temperature of 270 to 310° C. During this time the temperature of the reaction mixture remained somewhat below 250° C. The temperature of the fractionating column was regulated in such a way that the water of reaction was distilled off but the caproic acid returned to the reaction mixture.

After the heating the reaction mixture was distilled under a pressure of 14 to 15 mm. and the following fractions were obtained:

(*a*) 7.7 g. mainly caproic acid.
(*b*) 1.6 g. distilling below 180° C.
(*c*) 2.5 g. distilling between 180 and 210° C.
(*d*) 11.0 g. distilling between 210 and 220° C.

Fraction (*d*) consisted mainly of 2:6-dipentyl-3:5-dibutyl-gamma-pyrone with a subsidiary amount of isomers. No trace of the 7-butyl-trideca-6:8-dione initially used could be found by means of the usual ferric chloride test.

*Example 3*

The initial reaction mixture was of the following composition:

1 mol. of 4-methyl-heptadione-3:5.
2 mols. of propionic anhydride.
0.5 mol. of boric oxide.

This mixture was heated under reflux to 220° C. and the temperature was then gradually raised while distilling off caproic acid formed in the reaction to a temperature of 250° C. in the course of 4 hours. The pressure was then reduced to 10 mm. and a further amount of propionic acid distilled off. From the resulting reaction mixture a fraction composed mainly of 2:6-diethyl-3:5-dimethyl-gamma pyrone and isomers distilled over between 140 and 150° C. This fraction was saponified and the unsaponifiable matter, consisting of about 65% was recrystallized repeatedly from pentane.

It had the following characteristics:

| | |
|---|---|
| Acid value | 0 |
| Saponification value | 0 |
| Melting point (colourless needles) | 38.5° C. |
| Molecular weight | 180 |
| Refractive index at 40° C. | 1.4990 |

*Example 4*

The initial reaction mixture was as follows:

1 mol. of heptatriconta-9:10-28:29-dien-19-hexadec-7′:8′.
Enyl-18:20-dione.
1 mol. of oleic anhydride.
0.5 mol. of boric oxide.

The reaction mixture was heated under a pressure of 5 mm. to 280° C. and the temperature was maintained for five hours while refluxing the oleic acid liberated. Oleic acid was then distilled off at 1 mm. pressure and the residue was freed from boric acid by decantation and washing with hot water. The residue was composed substantially of 2:6-diheptadec-8[1]:9[1]-enyl-3:5-dihexadec-7[11]:8[11]-enyl-gamma-pyrone of refractive index $$n_D^{25}=1.4895$$

and iodine value 134.4 and saponification value 6.4. In the same manner, linoleic acid anhydride can be condensed with its corresponding diketone, heptatriconta-6:7-9:10-28:29-31:32-tetraen-19-hexadec-7′:8′ - 10′:11′-dienyl-18:20-dione, to yield the derivative 2:6-di-heptadec-8′:9′-11′:12′-dienyl-3:5-dihexadec -7″:8″ - 10″:11″-dienyl-gamma-pyrone.

*Example 5*

The initial reaction mixture had the following composition:

1 mol. of 9-hexyl-heptadeca-8:10-dione.
2 mols of caprylic anhydride.
0.5 mol. of boric oxide.

This mixture was heated as in Example 1 and the product was then fractionated under a pressure of 1 mm. The fraction boiling at 215 to 245° C. was composed mainly of 2:6-diheptyl-3:5-dihexyl-gamma-pyrone and isomers. It was a light yellow coloured oily liquid of refractive index $n^{20}=1.4828$ and molecular weight of 458 and a saponification value of 54.

What is claimed is:

1. 2:6-diheptadec-8′:9′-enyl - 3:5 - dihexadec - 7″:8″-enyl-gamma-pyrone.

2. 2:6-di-heptadec-8′:9′-11′:12′-dienyl-3:5 - dihexadec-7″:8″-10″:11″-dienyl-gamma-pyrone.

3. Process for preparing substitution derivatives of substances selected from the class consisting of alpha pyrone and gamma pyrone which comprises: (*a*) forming a mixture of an agent selected from the group consisting of monocarboxylic acids of the formula R—$CH_2$—COOH and anhydrides thereof with a beta-diketone of the formula $$R—CH_2—CO—CHR—CO—CH_2R$$

in which the radical R is selected from the group consisting of:

$$CH_3—CH=CH—CH_2—$$
$$CH_3—(CH_2)_7—CH=CH—(CH_2)_6—$$
$$CH_3—(CH_2)_4—CH=CH—CH_2—CH=CH(CH_2)_6—$$

and $$CH_3—(CH_2)_7—CH=CH—(CH_2)_{10}—$$

(*b*) heating said mixture at a temperature of 220° to 350° C. in the presence of a catalyst selected from the group consisting of boric oxide, boric acid salts of weak bases, boric acid salts of volatile bases, boric acid esters, and mixed anhydrides of boric acid and a monocarboxylic acid, (*c*) removing the water liberated in the reaction as it is formed, and (*d*) recovering from the reaction mixture a fraction composed substantially of the pyrone derivative.

4. Process for preparing a pyrone derivative which comprises: (*a*) forming a mixture of a beta-diketone of the formula R—$CH_2$—CO—CHR—CO—$CH_2$R with a substance selected from the group consisting of $RCH_2$—COOH and the anhydride thereof in which R represents the radical hexadec-7:8-enyl-, (*b*) heating said mixture at a temperature of 220° to 350° C. in the presence of boric oxide, (*c*) removing water liberated in the reaction as it is formed, and (*d*) recovering from the reaction mixture a fraction composed substantially of the pyrone derivative.

References Cited in the file of this patent

Kaushal et al.: Chem. Abst., vol. 40, page 5723 (1946).

Bhagwat et al.: Chem. Abst., vol. 41, page 1917 (1947).

Cavalier: "Chem. Reviews," vol. 41, pages 525–584 (1947).